May 24, 1960  R. L. BRACE ET AL  2,937,519
FUEL EVALUATION PROCESS

Filed Nov. 15, 1954  4 Sheets-Sheet 1

INVENTORS
R.L. BRACE
R.M. SCHIRMER
BY Hudson and Young
ATTORNEYS

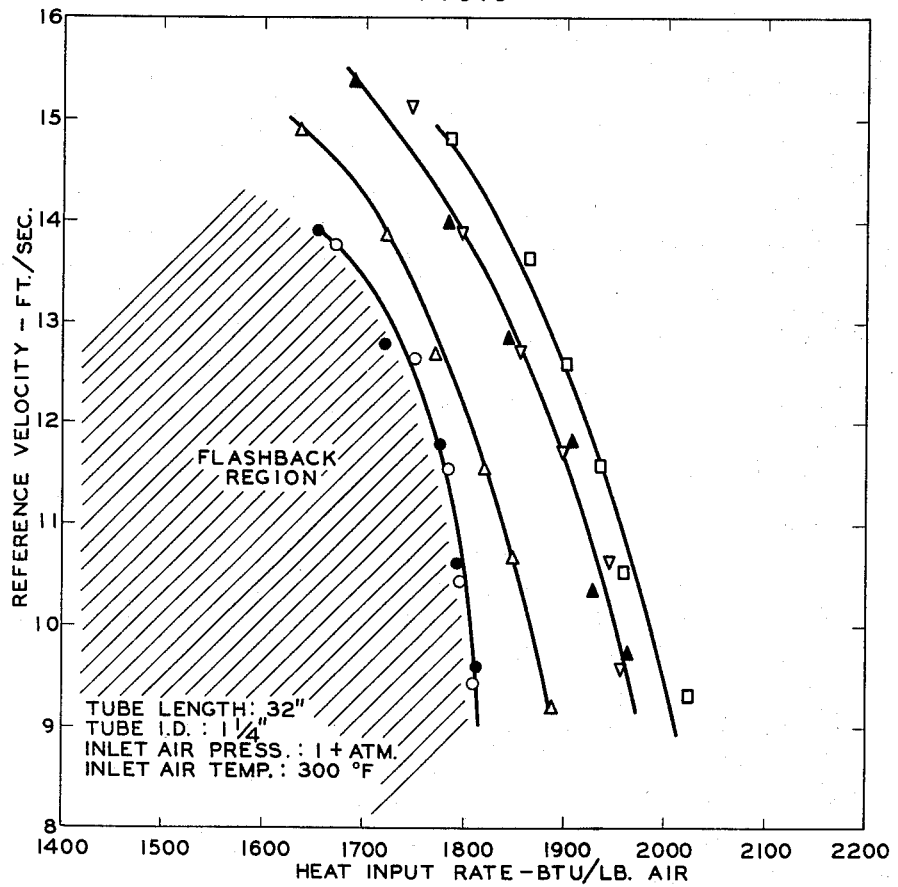

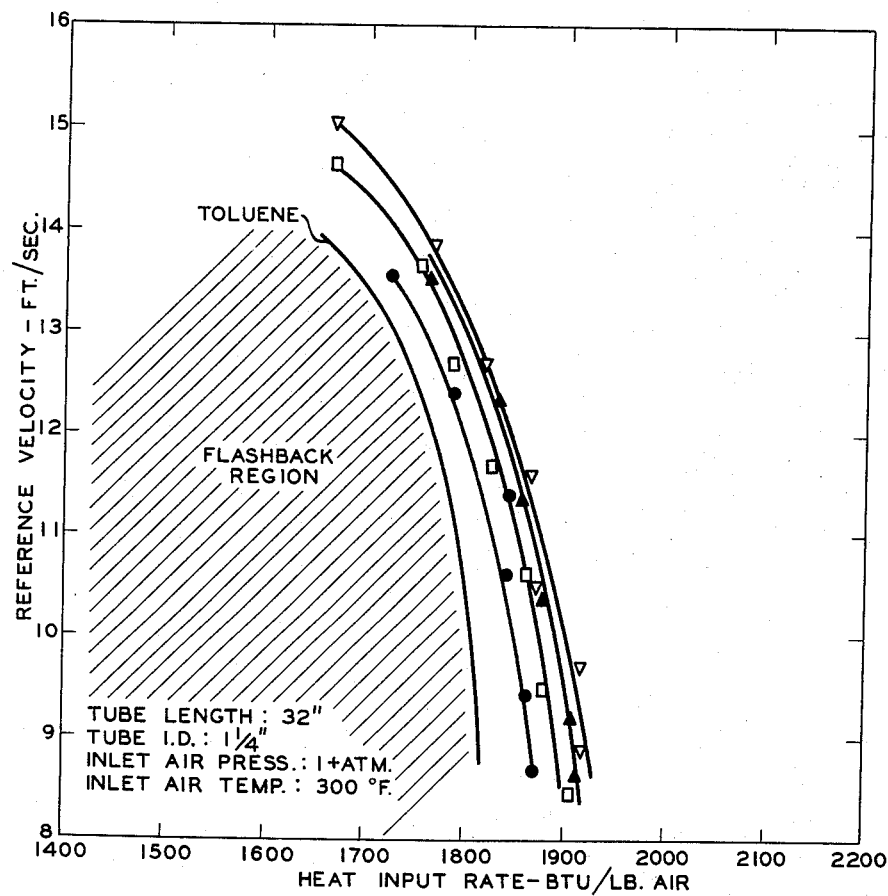

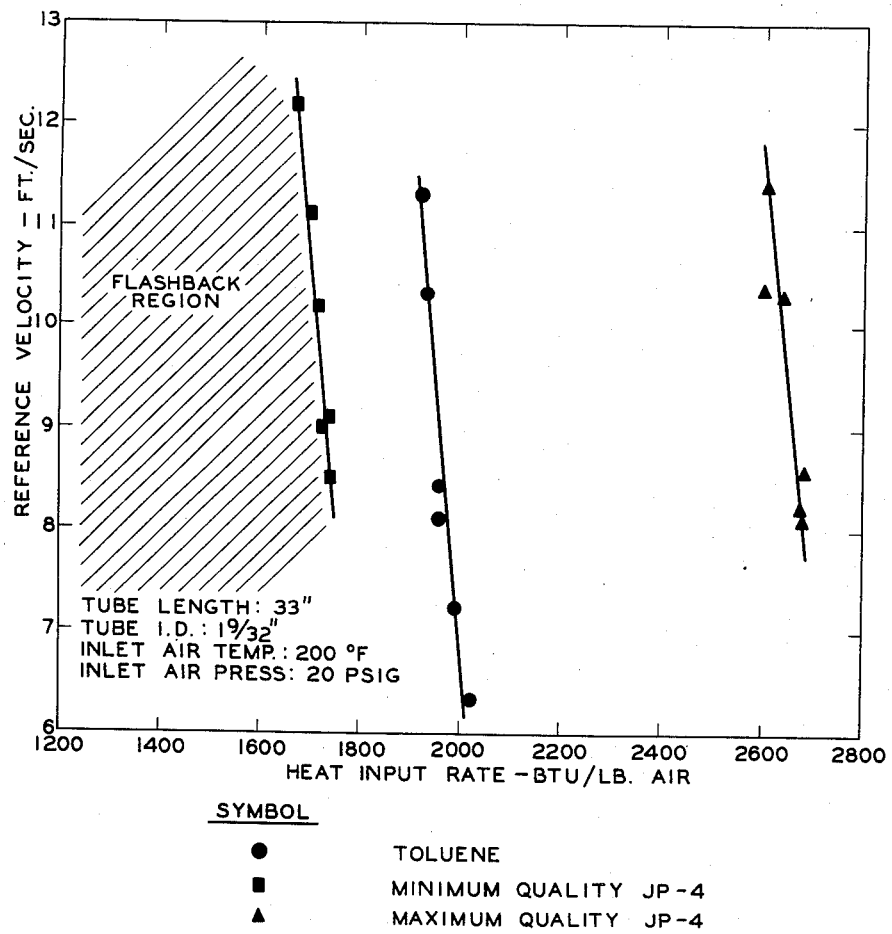

United States Patent Office 2,937,519
Patented May 24, 1960

2,937,519

FUEL EVALUATION PROCESS

Robert L. Brace and Robert M. Schirmer, Bartlesville, Okla., assignors to Phillips Petroleum Company, a corporation of Delaware Filed Nov. 15, 1954, Ser. No. 468,890

1 Claim. (Cl. 73—35)

This invention relates to the evaluation of fuels. In one of its more specific aspects it relates to a method and apparatus for evaluating the combustion characteristics of fuels. In another of its more specific aspects it relates to a method for evaluating combustion stability of fuels.

Jet engines can be operated on fuels varying widely in their combustion characteristics, however, the fuel used can and does affect engine performance. One criterion by which a fuel, intended for use in a jet engine, can be judged is its combustion stability. One method for determining the combustion stability of a fuel involves burning the fuel in a full scale engine in an elaborate and expensive test setup. Another, and somewhat improved method, is to utilize one combustion chamber of a jet type engine, such as a jet engine having a plurality of combustion chambers. In either case, a large volume of fuel is required for the test so that the testing of relatively scarce and/or expensive fuels and additives is usually not performed. Furthermore, these methods of testing require considerable time for a complete evaluation.

The following objects will be attained by at least one of the aspects of the invention.

It is an object of this invention to provide an improved method for evaluating fuels.

It is another object to provide a method for determining combustion stability of fuels.

Still another object is to provide an apparatus for carrying out the method of fuel evaluation.

Still another object of the invention is to provide an apparatus for determining combustion stability of fuels.

Other and further objects and advantages will be apparent to one skilled in the art upon studying the disclosure of this invention including the drawing wherein:

Figure 5 shows graphically the comparison of combustion characteristics of several pure hydrocarbons, Figure 6 shows graphically the effects of a combustion additive, and Figure 7 shows graphically the comparison of combustion characteristics of two jet engine fuels.

Figure 1:
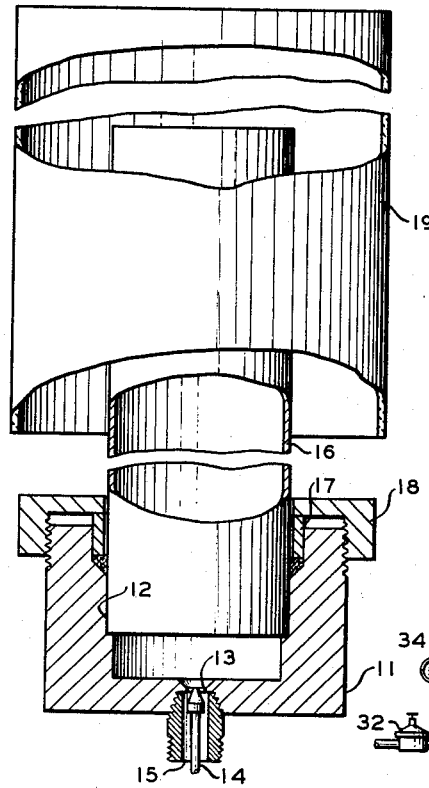
Figure 1 represents a vertical section of the burner of this invention.

As will be clear from the description in following paragraphs, the method described herein of determining combustion stability involves the establishment of stable flames at each of two different locations at different times. To avoid any possible ambiguity which might arise in the use of the terms "flame stability," "stable flames," "combustion stability," and "stable combustion," the first two terms will be used to refer to flames established during performance of the method of this invention, while the second two terms will be used in referring to that intrinsic property of a fuel which determines the establishment of a steady state combustion process in usual equipment such as gas turbines or ram jet engines in which the flame becomes anchored to a flame holder. Thus, a fuel having a high "combustion stability" will undergo "stable combustion" in a jet engine at relatively severe conditions.

The present invention relates to a method for comparing the combustion stability characteristics of fuels by a comparison of their flame speeds. The method comprises passing a metered stream of a combustion supporting gas, such as air, through an orifice into a burner tube; introducing a metered stream of fuel into the vena contracta of the orifice axially and concurrent to the combustion supporting gas stream; and igniting the mixture at the exit end of the burner tube. The ratio of the amounts of fuel and combsution supporting gas is then varied until the flame which has been established outside the burner tube flashes back into the tube and burns therein. The dimensions of the burner tube are such that complete mixing of the fuel and combustion supporting gas is not accomplished within the tube.

Flashback occurs when the stream velocity, within the tube, becomes smaller than the burning velocity of the fuel and the combustion wave propagates against the stream into the tube. The burning velocity of the fuel-air mixture is varied by changing the fuel-air ratio in such a manner that the change is toward that ratio at which the burning velocity is the maximum. For a given stream velocity, the burning velocity of the mixture at flashback is the same for all fuels. Therefore, the burning rate of a fuel, as an intrinsic property of the fuel, is greater the more the actual fuel-air ratio at flashback, at a given stream velocity, differs from the fuel-air ratio for maximum mixture burning velocity. In other words, in testing a series of fuels, that fuel for which the fuel-air ratio at flashback at a given stream velocity differs most from the fuel-air ratio at maximum burning velocity has the highest burning rate and, therefore, the greatest combustion stability. Since for a great number of fuels the fuel-air ratio at maximum mixture burning velocity for a given set of conditions differs from stoichiometric fuel-air ratio by approximately the same factor, it is convenient to express the results of the tests and, therefore, relative combustion stabilities in terms of the equivalence ratio (i.e., the actual fuel-air ratio divided by stoichiometric fuel-air ratio). Thus, if the first flame is established with an overly fuel-rich mixture, the higher the equivalence ratio the greater the combustion stability of the fuel. The converse also is true.

Since the heat input rate per pound of air is a function of fuel-air ratio, heat input rate may also be conveniently used in expressing the results of tests. Regardless of the direction from which the fuel-air ratio of maximum flame velocity is approached, the point of flashback establishes the limit of stable combustion of the fuel at that particular stream velocity.

The present invention discloses an improved burner for the combustion of fuels by means of which the method for evaluation of combustion stability can be practiced. The burner apparatus of this invention can also be employed in fundamental studies of combustion in many types of combustion processes. The burner of this invention can also be constructed with relatively large dimensions and employed for the development of power or for other uses such as a reactor in which pyrochemical processes can be performed.

The burner of the apparatus of this invention comprises a burner base having a cylindrical opening in one end and being closed at the other end and an elongated cylindrical burner tube having an outer diameter slightly smaller than the inner diameter of the cylindrical opening of the burner base, fitted into the open end of the burner base. Air is introduced axially into the burner tube through a sharp-edge orifice located in the closed end of the burner base. Fuel is also introduced axially into burner tube through a flow nozzle located at the vena contracta of the air orifice. Thus, air atomization of the fuel is obtained. The burner tube can be constructed of a transparent material such as Vycor (a trademark for a heat resistant glass manufactured by the Corning Glass Works), so that the presence of combustion within the burner tube can be observed visually. Alternatively, the burner tube can be constructed of an opaque material such as a metal and the location of combustion within the tube can be determined by thermocouples located in the wall of the burner tube. When a flame, which has been stabilized at the open end of the burner tube flashes back into the burner tube, the flashback is accompanied by an audible sound. Thus the flashback can be determined when an opaque tube is employed by means of instruments sensitive to audible sounds, such as a microphone and a recorder.

Various alternatives can be employed for determining the position of the flame with respect to the end of the burner tube. Thus a photo-electric cell can be positioned beside the tube and properly shielded from the flame when the flame is established at the top of the tube and actuated by the flame when it flashes back into the tube.

The burner tube is proportioned, with respect to volume and velocity of fuel and air therethrough, so that complete mixing of air and fuel is not obtained within the tube. The fuel and air, therefore, comprises a stratified mixture and not a completely premixed mixture.

The flame, which is established at the top of the burner tube, is not cone-shaped, as in most burners, but is parabolic in cross-section, ragged at the edges, and quite thick. The ragged edge comprises luminous streamers surrounding the non-luminous center portion. The streamers are considered to be indicative of the stratified condition of the fuel and air mixture.

When the burner is used in test procedures for evaluating the combustion stability of fuels, a flame is first stabilized at the open end of the burner tube and a cylindrical shield of a diameter greater than the diameter of the burner tube is employed surrounding the flame area at the end of the burner tube so as to reduce the effects of random air currents. Ignition of the fuel and air mixture can be accomplished by any of the usual ignition means and a portable propane torch is ordinarily used although a spark ignition device is also sometimes used.

Referring now to Figure 1, the burner base 11 having cylindrical opening 12, orifice 13, fuel inlet 14 and air inlet 15 has burner tube 16 secured in opening 12 by packing 17 and packing gland 18. Shield 19 is positioned around the open end of burner tube 16.

Figure 2:
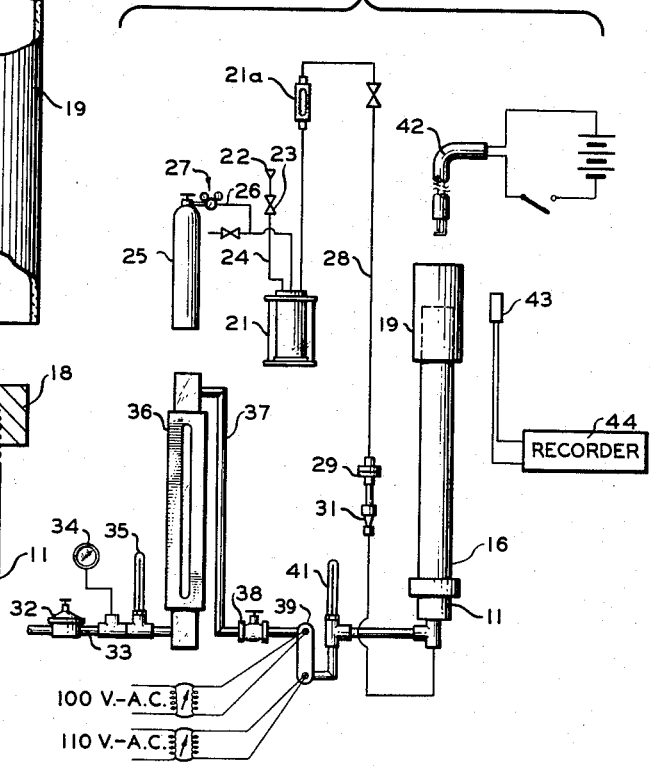
Figure 2 is a schematic flow diagram of the complete apparatus.

Figure 2 represents a schematic flow diagram of the apparatus of this invention showing burner base 11, burner tube 16 and shield 19 in flow arrangement with the remaining elements of the apparatus although it is to be understood that the illustrated arrangement is schematic and the position of the various elements can be arranged for convenience.

The fuel to be tested is placed in calibrated container 21 through funnel 22, open valve 23 and line 24 after which valve 23 is closed. Nitrogen, or other inert gas, contained in cylinder 25 is admitted to cylinder 21 through line 26 with a predetermined pressure determined by pressure regulator 27. Fuel flows from cylinder 21 through line 28, screen 29 and orifice 31 to fuel inlet 14 to burner base 11. Rotameter 21a can be used to measure the fuel flow in place of calibrated cylinder 21, if desired, in which case cylinder 21 serves merely for fuel storage. If rotameter 21a is used, orifice 31 may be removed from the system. Even when using calibrated cylinder 21 to measure fuel flow, orifice 31 may, in many cases, be removed from the system since its object is merely one of increasing the sensitivity of the fuel flow control system by decreasing the fuel flow for a given applied pressure.

Dried or water saturated compressed air passes through regulator 32, line 33 containing pressure gauge 34 and thermometer 35 to calibrated rotameter 36. The air flows from rotameter 36 to line 37 containing control valve 38, electrical heater 39 and thermometer 41 to air inlet 15 to burner base 11. Ignition of the fuel air mixture at the open end of burner tube 16 is obtained by means of ignition device 42 shown as an electrical sparking means but which can also be a propane torch.

The position of the flame with respect to the end of burner tube 16 can be determined visually or by means of a photo-electric cell, in case the tube 16 and shield 19 are transparent, or can be determined by flame detectors or thermocouples, in case the tube 16 and shield 19 are opaque, or can be detected by means of a microphone 43 and recorder 44 as illustrated.

Figure 3:
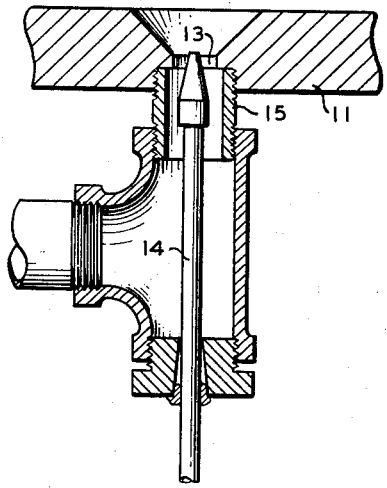
Figure 3 is an enlarged sectional view of the base of the burner of Figure 1.
Figure 4:
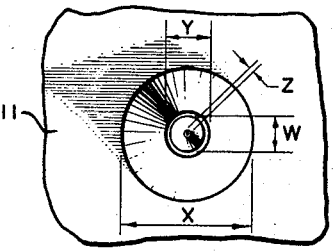
Figure 4 is a plan view of Figure 3.

Figures 3 and 4 show the details of the arrangement of the fuel and air inlets in burner base 11.

A description of the operation of the novel burner of this invention will be set forth in the examples which follow. The method of operation, as described with respect to the examples, is illustrative of the methods of fuel evaluation which can be employed using this apparatus but the examples are not to be taken as limiting the invention.

EXAMPLE I

The fuel to be tested was placed in calibrated container 21 and valve 23 was closed. The air flow was adjusted by regulation of valves 32 and 38 and the temperature of the air was regulated at about 300° F. by regulation of heater 39. When the air temperature was established at 300° F., the air flow was set at the desired rate and the fuel was then admitted to the burner by opening regulator valve 27. A satisfactory fuel flow rate was obtained with a nitrogen pressure of about 30 p.s.i.g. although a higher or lower pressure can be utilized. The test was started with a fuel-rich mixture and the fuel-rich mixture was ignited by a portable electric sparking device. Ignition was sometimes accomplished by applying a lighted, portable propane torch to the top of the burner tube. After the mixture was ignited and flame was established at the top of the burner tube, the fuel flow was then gradually decreased, while maintaining the flow of air constant, until the flame established at the burner tube rim flashed back into the tube. At the point of flashback, the following were recorded: cold air temperature, inlet air temperature, air rotameter reading, and fuel rotameter reading. After checking the flashback point at least once, the air flow was increased by a predetermined increment and the process repeated. The recorded data were converted to values of heat input rate and a reference velocity at flashback. Thus the flashback limits, or the combustion stability characteristics for that particular fuel, were established on the basis of an allowable heat input rate. The heat input rate was determined by the heating value of the fuel per pound of air according to the following formula:

$$\text{Heat input rate} = \text{heat value}^{1} \times \frac{\text{fuel flow}}{\text{air flow}} \text{ at flashback}$$

[1] The heating value used is that required to yield $CO + H_2O$ as gases.

The reference velocity was determined by the air flow conditions at the entry to the burner tube, neglecting the mass of the fuel particles.

Figure 5 is a graphic presentation of the results of a series of runs wherein relative combustion stability characteristics of various pure hydrocarbons were determined. Check runs recorded on two of the hydrocarbons tested demonstrate the reproducibility of the results obtained with the apparatus of this invention and according to the practice of the method of this invention. The flashback region represents the area of operating conditions wherein the combustion characteristics of the fuel are such that the flame would become anchored to a flame holder, as in stable gas turbine or ram jet combustion operation, if a flame holder were provided in the burner tube, that is, the region of stable combustion.

The dimensions of the elements of the apparatus employed in the performance of the runs graphically presented in Figures 5 and 6 were as follows: the length of burner tube 16 was 32", the inside diameter of tube 16 was 1¼", the length of shield 19 was 14" and the inside diameter of shield 19 was 3". The dimensions of the fuel inlet 14 and the orifice 13 as represented in Figure 4 are $X=0.625"$, $Y=0.187"$, $Z=0.0225"$, and $W=0.117"$.

Figure 6 shows the effect of various amounts of propylene oxide on the combustion stability characteristics of toluene as determined by the hereinbefore procedure.

EXAMPLE II

Two jet engine fuels were evaluated using the apparatus of this invention. These fuels were identified as minimum quality JP-4 and maximum quality JP-4 and a summary of the physical and chemical properties of these fuels are recorded in Table I.

*Table I*

| Test Fuels | Spec. Grav. | Reid Vapor Pres. | HT of Combustion | Aromatic Content | ASTM Distillation | | | | | Stoic Fuel-Air Ratio |
|---|---|---|---|---|---|---|---|---|---|---|
| | | | | | IBP | 10% | 50% | 90% | EP | |
| | 60/60 F | Lb. | Btu/Lb | Percent Vol. | | | | | | |
| A65 Min. Quality JP-4 | 0.7043 | 2.80 | 19,094 | 0.6 | 164 | 185 | 205 | 382 | 500 | 0.08454 |
| A66 Max. Quality JP-4 | 0.7047 | 2.65 | 19,091 | 1.2 | 167 | 190 | 206 | 435 | 500 | 0.08452 |

The runs were conducted in the following manner. The calibrated container 21 was filled with the fuel to be tested and valve 23 was closed. The desired air flow was established by adjustment of valves 32 and 38 and the temperature of the flowing air was adjusted by manipulation of heaters 39. After the flowing air was adjusted to the desired conditions of temperature and flow rate, nitrogen pressure was admitted to calibrated container 21 by opening regulator valve 27 so as to force fuel to fuel inlet 14 and orifice 13. Ignition of the fuel-air mixture was accomplished at a low air flow rate so as to start with an over-rich mixture. The air flow was then increased at a constant fuel flow rate until the flame at the top of the burner tube flashed back into the tube. The state of conditions at flashback can be defined as the condition reached at which the stream velocity becomes smaller than the burning velocity and the combustion wave propagates against the gas stream into the tube. The results of the runs performed on the JP-4 type fuels and toluene are shown graphically in Figure 7. The apparatus used in the runs in Example II differed from the apparatus used in the runs of Example I in that the burner tube was 33" long and had an inside dimension of 1%₂". The inlet air temperature in these tests was about 200° F., instead of about 300° F. as in Example I.

The examples demonstrate several uses for the apparatus and method of this invention as utilized in two preferred embodiments. It will be evident to one skilled in the art that the versatile apparatus herein disclosed can be utilized in other ways and for other purposes.

Variations and modifications are possible within the scope of the disclosure of the invention, the essence of which is a method and apparatus for the rapid and accurate evaluation of the combustion stability characteristics of fuels.

That which is claimed is:

The method of determining combustion stability characteristics of a liquid fuel for use in a jet engine which comprises passing a measured stream of combustion supporting gas through a zone of convergence and into a combustion zone at a velocity of between about 6 feet per second per about 40 cubic inches of combustion zone space and about 16 feet per second per about 40 cubic inches of combustion zone space; introducing a measured stream of said fuel into said zone of convergence, axially and concurrently with the flow of said combustion supporting medium at a velocity within the aforesaid range so that partial mixing of fuel and air results; igniting a resulting partial mixture of fuel and air in said combustion zone; varying the flow of one of said streams by predetermined increments within the aforesaid range until unstable combustion occurs; and repeating the aforesaid steps at different predetermined initial velocities of combustion supporting medium and fuel within the aforesaid range.

References Cited in the file of this patent

UNITED STATES PATENTS

| | | |
|---|---|---|
| 1,442,574 | Johnson | Jan. 16, 1923 |
| 2,500,964 | Sullivan et al. | Mar. 21, 1950 |
| 2,519,237 | Dufour | Aug. 15, 1950 |
| 2,574,665 | Schuller | Nov. 13, 1951 |
| 2,603,085 | Cannon | July 15, 1952 |

FOREIGN PATENTS

| | | |
|---|---|---|
| 416,972 | Great Britain | Sept. 25, 1934 |

OTHER REFERENCES

Stability and Structure of Burner Flame, Lewis et al., in Journal of Chemical Physics, vol. 11, 1943, page 75.

Ignition and Flame Stabilization in Gases, Lewis et al., in Transactions of the ASME, vol. 70, 1948, page 307.

Third Symposium on Combustion Flame and Explosion Phenomena, published by Williams and Wilkens, Baltimore, pages 23, 24, 47, 152, and 714-718, 1948.

Fourth Symposium on Combustion (MIT) 1953, published by Williams and Wilkens, Baltimore, pages 765-771.